United States Patent [19]

Tagami

[11] Patent Number: 5,339,118
[45] Date of Patent: Aug. 16, 1994

[54] TONE CORRECTING APPARATUS FOR LASER DISPLAY SYSTEM

[75] Inventor: Shigekatsu Tagami, Kanagawa, Japan

[73] Assignee: Sony Corporation, Tokyo, Japan

[21] Appl. No.: 18,710

[22] Filed: Feb. 17, 1993

[30] Foreign Application Priority Data

Feb. 17, 1992 [JP] Japan .................. 4-029740

[51] Int. Cl.⁵ .................. H04N 1/40; H04N 3/08; H04N 9/31; H04N 5/74
[52] U.S. Cl. .................. 348/744; 348/760; 348/769
[58] Field of Search .................. 358/231, 60, 61, 63, 358/66, 69, 280; 348/744, 750, 752, 754, 757, 759, 760, 762, 769, 615, 215; H04N 3/08, 5/74, 1/40, 9/31

[56] References Cited

U.S. PATENT DOCUMENTS

| | | | |
|---|---|---|---|
| 4,586,089 | 4/1986 | Nakazato et al. | 358/280 |
| 5,097,324 | 3/1992 | Tanaka et al. | 358/60 |
| 5,231,481 | 7/1993 | Eouzan et al. | 358/60 |

FOREIGN PATENT DOCUMENTS

| | | | |
|---|---|---|---|
| 273361 | 6/1988 | European Pat. Off. | H04N 1/40 |
| 402137 | 12/1990 | European Pat. Off. | H04N 9/31 |
| 3-116088 | 5/1991 | Japan | G09G 3/02 |

OTHER PUBLICATIONS

"Image Display" pp. 183 to 184, written by Iwao Ohishi, Takatoshi Ohkoshi, Norihiko Nakayam and published by Corona Publishing Limited.

Primary Examiner—James J. Groody
Assistant Examiner—Glenton B. Burgess
Attorney, Agent, or Firm—Limbach & Limbach

[57] ABSTRACT

A tone correcting apparatus for an image display apparatus is disclosed. The apparatus includes a test signal generating circuit for generating a test signal, a memory for outputting tone correction data depending upon the test signal, a modulating circuit for modulating the light from a light source depending upon the tone correction data, a detecting circuit for detecting the modulated light from the modulated circuit, and a control circuit for calculating correction data depending upon a detected signal output from the detecting circuit. The correction data is stored in memory. Also disclosed is a laser display apparatus in which a laser beam is modulated according to a video signal before being displayed. An synchronizing separating circuit separates a synchronizing signal from the video signal. A selecting circuit selects between a test signal generated by a test signal generating circuit and the video signal depending upon the synchronization signal. A memory outputs corresponding tone correction data depending upon the signal selected.

10 Claims, 5 Drawing Sheets

TONE CORRECTING APPARATUS FOR LASER DISPLAY SYSTEM

BACKGROUND OF THE INVENTION

1. Field of the Invention

The present invention relates to a tone correcting apparatus for correcting tone of a picture displayed by a laser display apparatus which modulates a laser beam by using light modulators such as an optoelectronic modulator, an acoustooptic modulator or the like.

2. Description of the Prior Art

Figure 1:
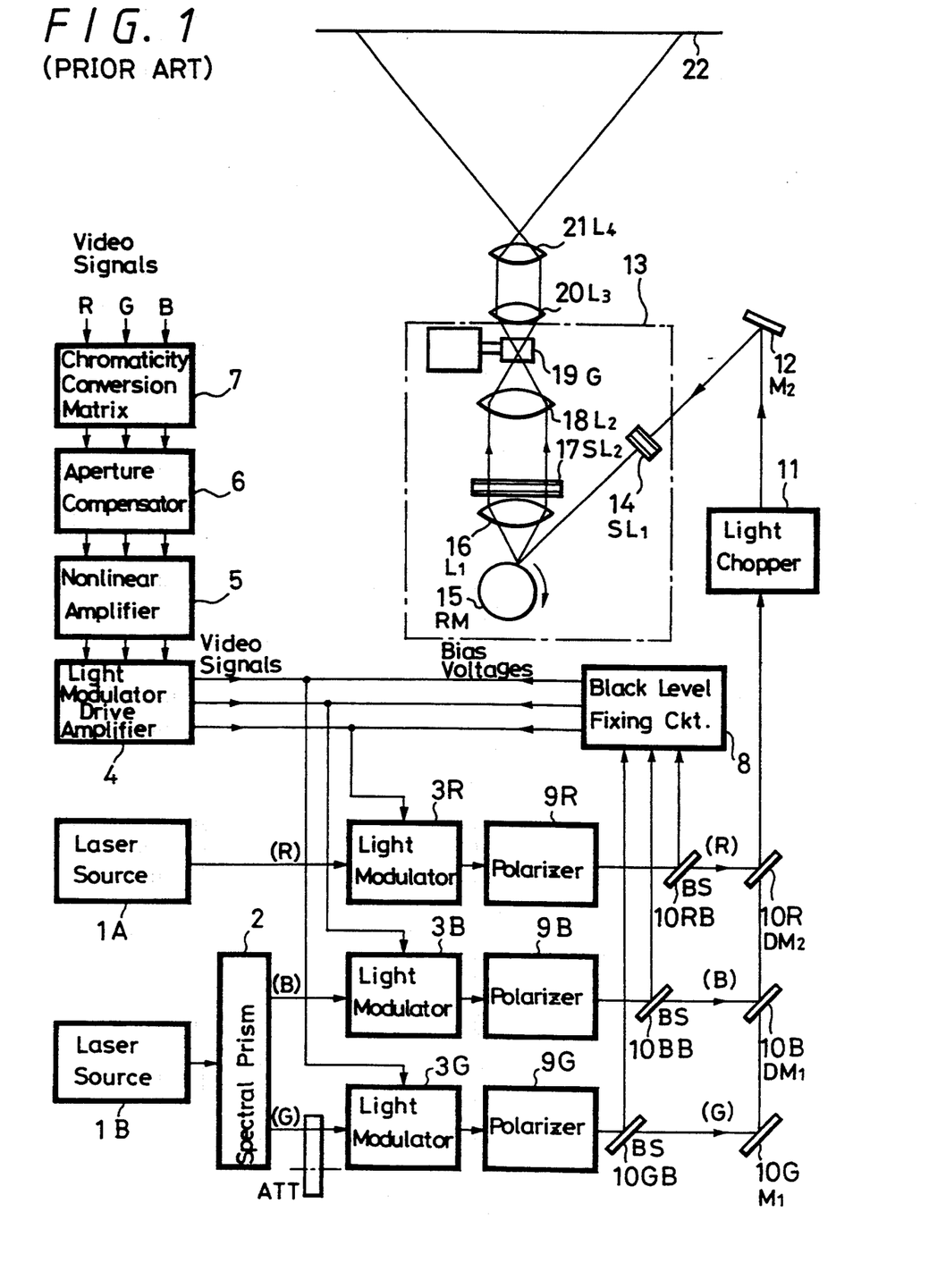
FIG. 1 is a block diagram showing a projection type color laser display apparatus according to the prior art.

Various types of color laser display apparatus have been proposed so far. Fundamentally, a color laser display apparatus is constructed as shown in FIG. 1. FIG. 1 shows a projection type color laser apparatus that is described in "Image Display" pp. 183 to 184, written by Iwao Ohishi, Takatoshi Ohkoshi, Norihiko Nakayam and published by Corona Publishing Limited.

As shown in FIG. 1, there are provided laser sources 1A and 1B. A laser beam from the laser source 1B is split by a spectral prism 2 into blue (B) and green (G) laser beams. The green laser beam (G) is introduced through a light intensity variable attenuator ATT into a light modulator 3G for the green laser beam. The blue laser beam, split by the spectral prism 2, becomes incident on a light modulator 3B for the blue laser beam (B). Similarly, the red laser beams (R) from the laser source 1A is introduced into a light modulator 3R for the red laser beam (R).

As the light modulator 3 formed of these light modulators 3R, 3B, 3G for the red, blue and green laser beams (R, B, G), there are utilized such one that an electric field dependency of birefringence such as KDP (potassium dihydrogenphosphate), DKDP (double potassium dihydrogenphosphate), ADP (ammonium dihydrogenphosphate) or the like is utilized as the optoelectronic modulator to modulate a light by a video signal or the like or that the acoustooptic modulator is used to modulate a light. The acoustooptic modulator makes effective use of the fact that a cyclic change of a refractive index caused by ultrasonic waves propagating a transparent medium acts as a kind of diffraction grating relative to an incident laser beam so that the diffraction of laser beam occurs. Intensity of diffracted light, intensity of sound wave and the emitted angle of diffracted angle are dependent on the frequency of ultrasonic wave. As the acoustooptic modulator, there is constructed a diffraction grating by the cyclic change of refractive index having a cycle of wavelength sound wave that takes place when ultrasonic waves propagate into crystal materials such as $TeO_2$, $PbMoO_4$ or the like.

R, B and G video signals from a light modulator drive amplifier 4 are supplied to these light modulators 3, in which the laser beams are optically modulated by these video signals R, B and G.

Video signals R, B, G from a camera or the like are processed in a matrix fashion by a chromaticity conversion matrix circuit 7. Then, the video signals are compensated in aperture by an aperture compensator 6 and then supplied through a nonlinear amplifier 5 to the light modulator drive amplifier 4. The video signals R, B, G from the light modulator drive amplifier 4 are added with bias voltages from a black level fixing circuit 8.

Modulated laser beams from the light modulators 3R, 3B and 3G are reflected by beam splitters (BS) 10RB, 10BB, 10GB after passing through polarizers 9R, 9B, 9G for the red, blue and green laser beams and introduced into the black level fixing circuit 8 which then determines the bias voltages of the video signals R, B, G. Laser beams passed through the beam splitters 10RB, 10BB, 10GB are traveled through dichroic mirrors ($DM_1$, $DM_2$) 10R, 10GB and a mirror ($M_1$) 10G and then chopped by a light chopper 11. These laser beams are traveled through a mirror ($M_2$) 12 and then introduced into a two-dimensional scanner 13 that constructs horizontal and vertical deflectors.

The laser beam reflected by the mirror ($M_2$) from the light chopper 11 is introduced through a cylindrical lens 14 ($SL_1$), which is used to correct an irregular scanning line pitch, into a polygon mirror (RM) 15 serving as a horizontal deflector. Laser beams reflected by the polygon mirror 15 are traveled through a first relay lens ($L_1$) 16, a cylindrical lens 17 and a second relay lens ($L_2$) 18 and then focused on a galvano meter (G) 19 serving as a vertical deflector. These laser beams are deflected in vertical direction by the galvano meter (G) 19 and then projected through projection lenses ($L_3$, $L_4$) 20, 21 on a screen 22 as a picture.

Figure 2:
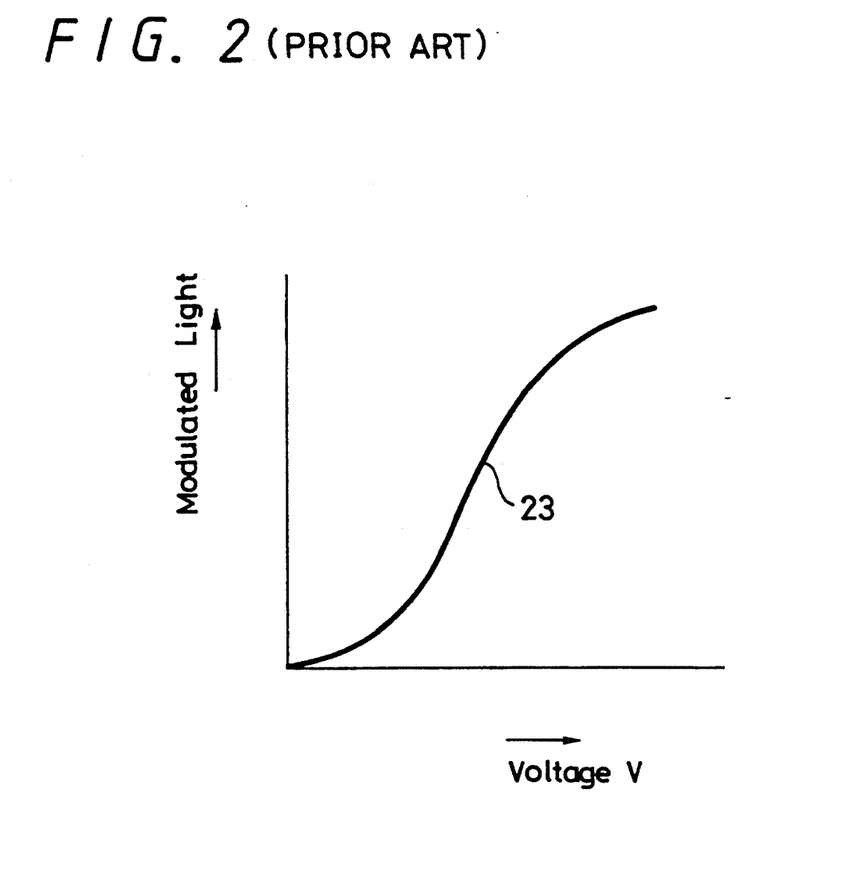
FIG. 2 is a characteristic graph of a modulated light versus voltage characteristic of an light modulator used in the conventional color display apparatus shown in FIG. 1.

The aforesaid color laser display apparatus employs the light modulators 3 (3R, 3B, 3G) and these light modulators 3 employ the optoelectronic modulators or acoustooptic modulators. However, there is then the problem that a relationship between modulated laser beam and a modulated voltage presents a distortion as shown by a $sin^2$ curve 23 in FIG. 2. As a method that is known most to correct such distortion, it is known that a distortion is corrected in an analog fashion by using a polygonal line approximating circuit formed of diodes or the like to thereby correct a tone of a picture displayed on a screen.

Figure 3:
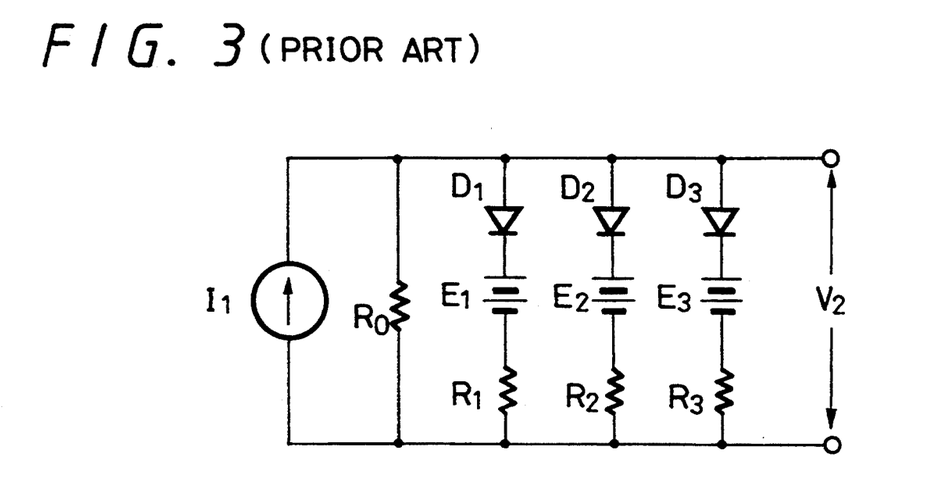
FIG. 3 is a diagram showing a conventional polygonal line approximating circuit formed of diode.
Figure 4:
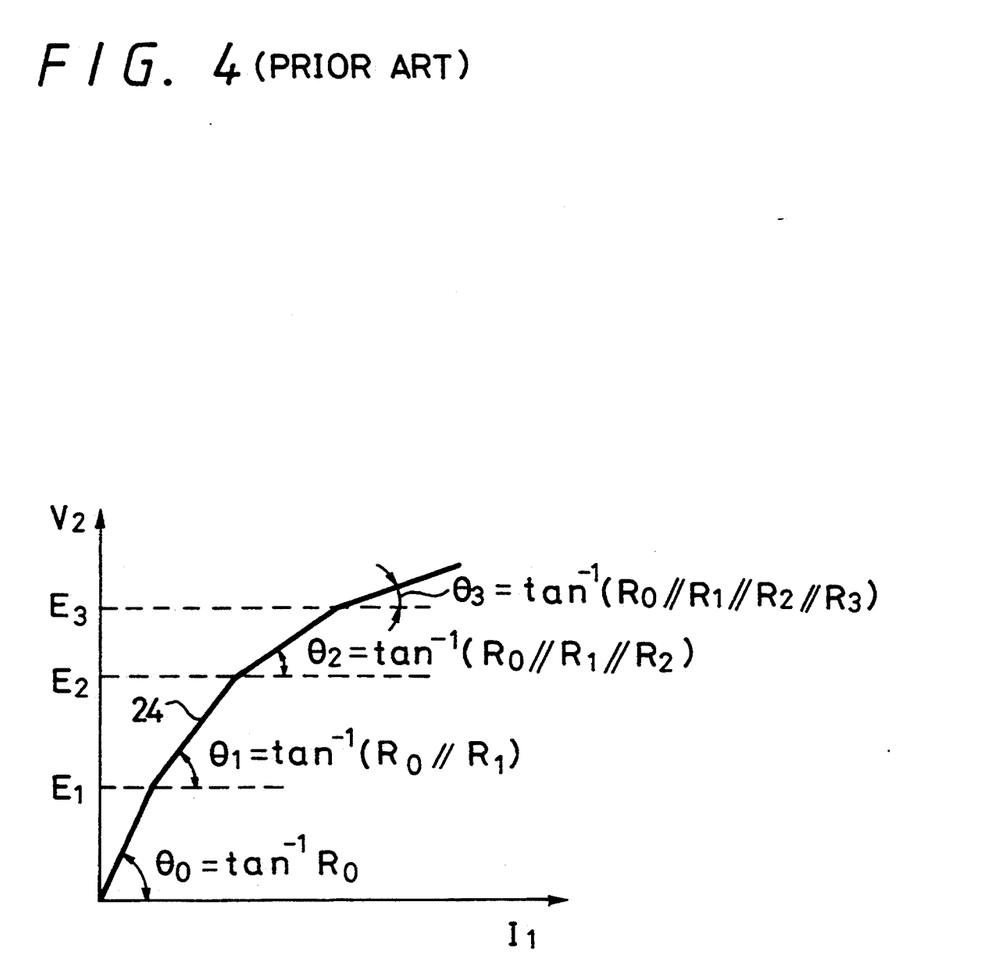
FIG. 4 is a diagram used to explain polygonal curved line of the polygonal line approximating circuit formed of the diode shown in FIG. 3.

FIG. 3 shows in principle an arrangement of a polygonal line approximating circuit formed of diodes. As shown in FIG. 3, a resistor $R_0$ is connected to a current source $I_1$ in parallel. A series circuit of a diode $D_1$, a reference voltage source $E_1$ and a resistor $R_1$ is connected to the current source $I_1$. Similarly, a series circuit of a diode $D_2$, a reference voltage source $E_2$ and a resistor $R_2$ and a series circuit of a diode $D_3$, a reference voltage source $E_3$ and a resistor $R_3$ are respectively connected to the current source $I_1$ in parallel. Then, a relation between the current source $I_1$ and an output voltage $V_2$ can be presented as a polygonal line curve 24 shown in FIG. 4 because a voltage versus current characteristic of diode becomes an exponential function. If angles $\theta_0$ to $\theta_3$ of polygonal line is selected so as to provide a predetermined tone, then the predetermined polygonal line curve can be obtained.

It has been known that the polygonal line approximating circuit formed of a plurality of resistors and diodes and a measuring apparatus for monitoring a tone characteristic of the laser display apparatus are provided on the outside of the laser display apparatus to correct a tone. Japanese Laid-Open Patent publication No. 3-116088 describes such a proposal that, when a laser display apparatus is assembled, a measurement is carried out by using a luminance signal for adjustment and a tone is corrected by using a ROM (read only memory) in which there is stored a luminance correction value calculated from a measured value.

If the conventional polygonal line approximating circuit using the diodes or the like fine corrects tone, then diodes $D_1$, $D_2$, $D_3$, ... and resistors $R_1$, $R_2$, $R_3$, ... corresponding to the number of polygonal lines are required, which unavoidably increases the number of assembly parts in the polygonal line approximating circuit. Also, upon adjustment, voltages applied to the diodes corresponding to the polygonal lines approximated must be adjusted. In addition, the adjustment of such respective voltages cannot be independently made, which then make the adjustment complicated.

In order to correct tone o#each laser display apparatus strictly, there is required an external measuring apparatus which monitors tone characteristics. Further, since a tone characteristic of the same laser display apparatus is changed due to an aging change of a light modulator, correction data obtained in the assembly process is not sufficient. Hence, tone characteristics are measured periodically by the external measuring apparatus and must be corrected. Furthermore, according to the conventional tone correcting apparatus, the tone cannot be corrected automatically while a picture of a video signal is being projected onto a picture screen under normal condition.

OBJECTS AND SUMMARY OF THE INVENTION

Therefore, it is an object of the present invention to provide a tone correcting apparatus in which the aforesaid shortcomings and disadvantages encountered with the prior art can be eliminated.

More specifically, it is an object of the present invention to provide a tone correcting apparatus in which tone can be automatically corrected without external measuring apparatus and calculating apparatus while an image is projected on a laser display apparatus or the like in the normal condition.

According to a first aspect of the present invention, there is provided a tone correcting apparatus for an image display apparatus in which a light from a light source is modulated by a modulating circuit on the basis of a video signal and displayed as an image by a deflecting circuit. This tone correcting apparatus comprises a test signal generating circuit for generating a test signal, a memory for outputting tone correction data on the basis of the test signal, a modulating circuit for modulating the light from the light source on the basis of the tone correction data, a detecting circuit for detecting a modulated light from the modulating circuit, and a control circuit for calculating correction data on the basis of a detected signal from the detecting circuit and storing the correction data in the memory.

In accordance with a second aspect of the present invention, there is provided a laser display apparatus in which a laser beam emitted from a laser light source is modulated on the basis of a video signal to form a modulated light and the modulated light is displayed. This laser display apparatus comprises a synchronizing separating circuit for separating a synchronizing signal from the video signal, a test signal generating circuit for generating a test signal, a selecting circuit for selecting any one of the video signal and the test signal on the basis o#the synchronizing signal, a memory for outputting tone correction data on the basis of either the video signal or the test signal from the selecting circuit, a modulating circuit for modulating a light from the laser light source on the basis of the tone correction data, a detecting circuit for detecting a modulated light from the modulating circuit, and a control circuit for calculating the tone correction data from a detected signal from the detecting circuit on the basis of the test signal and storing the tone correction data in the memory.

According to the tone correcting apparatus of the present invention, the test signal is inserted into the modulated light during the vertical blanking period of the composite video signal to monitor the modulated light. A difference between the tone obtained on the basis of the modulated light thus monitored and the ideal characteristic is fed back. Then, tone correcting data is calculated by the calculating circuit such as a micro-processor or the like and stored in the memory. Under the normal condition, the tone correcting apparatus is driven to automatically correct the tone. Therefore, there can be obtained the tone correcting apparatus which can automatically correct tone while the image of the video signal is being displayed.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

A tone correcting apparatus for use in a color laser display apparatus according to an embodiment of the present invention will hereinafter be described with reference to the drawings.

Figure 5:
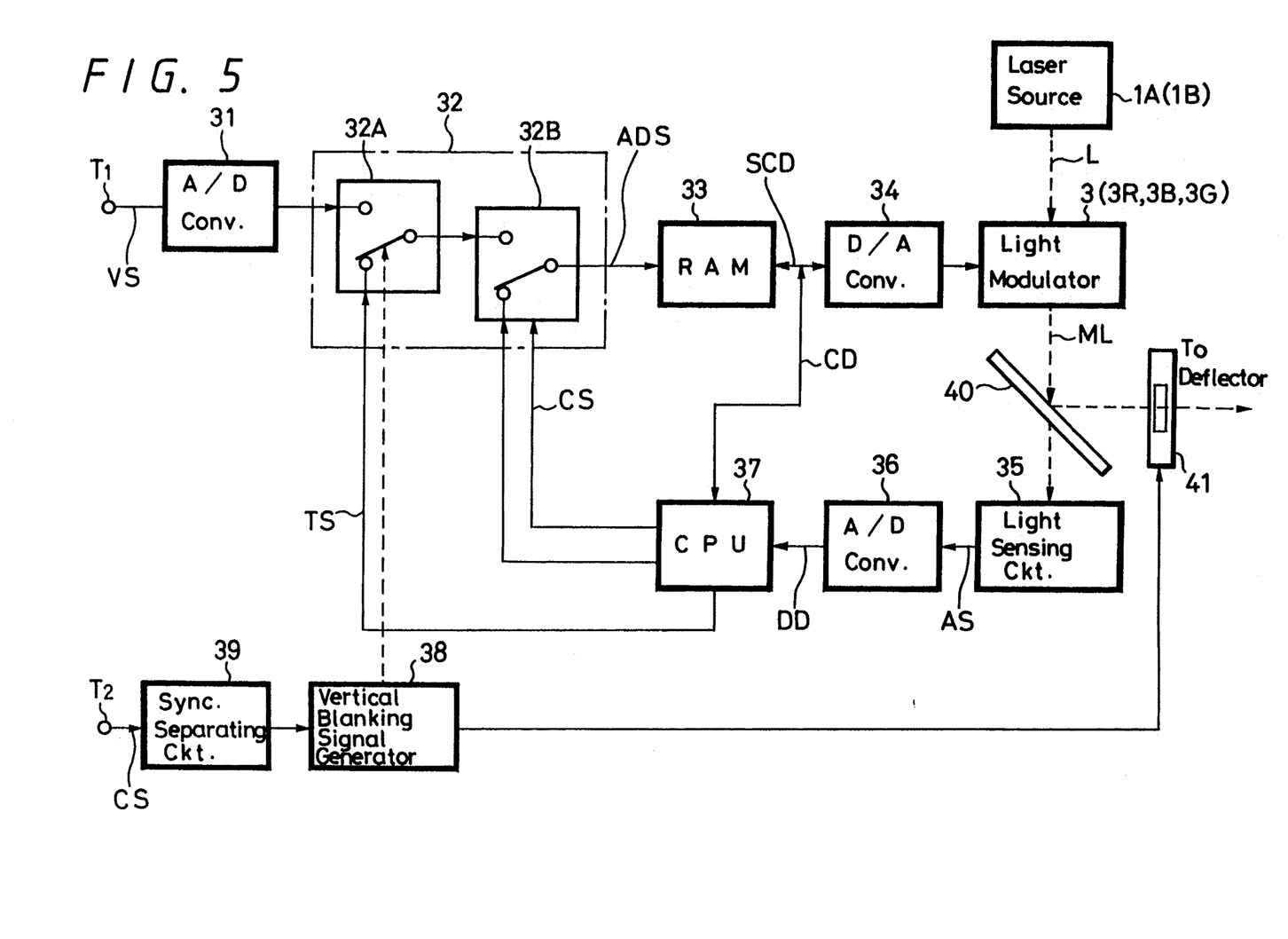
FIG. 5 is a block diagram showing a tone correcting apparatus according to an embodiment of the present invention.

FIG. 5 is a block diagram showing a main portion of the tone correcting apparatus according to the embodiment of the present invention. Although there is provided a single circuit system that corrects tone of one light modulator 2 as shown in FIG. 5 for simplicity, the color laser display apparatus needs circuits corresponding to the light modulators 3R, 3B and 3G that respectively modulate three R, B, G laser beams or more as earlier noted with reference to FIG. 1. If the processing for correcting tone at every light modulators 3R, 3B, 3G is carried out in a time division fashion, then it will be sufficient to provide a set of a light sensing circuit 25, an analog-to-digital (A/D) converter and a calculating circuit 37 such as a micro-processor or the like which will be described later on.

As shown in FIG. 5, to an input terminal T1, there is supplied an analog component video signal VS such as G, B, R or Y, Pb, Pr or the like. An NTSC composite video signal CS or the like is supplied to an input terminal T2.

The video signal VS supplied to the input terminal T1 is supplied to an A/D converter 31, in which it is converted into digital data. The digital data from the A/D converter 31 is supplied to a multiplexer 32.

The multiplexer 32 includes a switch 32A that switches the video signal VS and a test signal TS at the header of a vertical synchronizing (sync.) signal from a vertical sync. signal generator 38. The video signal VS or test signal TS thus selected is supplied to a switch 32B of the next stage.

The switch 32B is supplied with an address select signal CS from a calculating circuit (hereinafter referred to as a CPU (central processing circuit)) 37 such as a micro-processor or the like. On the basis of the address select signal CS supplied thereto, the switch 32B selects the video signal VS or the test signal TS and supplies the same to the next volatile memory circuit (hereinafter referred to as a RAM (random access memory)) 33 as a read address or a write address.

The RAM 33 outputs tone correction data SCD stored therein in response to the read address ADS supplied thereto from the switch 32B and supplies the same to a digital-to-analog (D/A) converter 34. The D/A converter 34 converts the digital data into an analog signal. This analog signal is supplied through the conventional light modulator drive amplifier 4 shown in FIG. 1 or the like to the light modulator 3.

As shown in FIG. 5, a laser beam L from a laser source 1A (1B) is introduced into the light modulator 3, in which it is modulated by a signal that has been converted by the D/A converter 34 from digital to analog data. A modulated laser beam ML emitted from the light modulator 3 is passed through a beam splitter 40 and then reflected onto the two-dimensional scanner 13 (see FIG. 1) which constructs the horizontal deflector. Also, the modulated laser beam ML is introduced through the beam splitter 40 into a photo-diode or the like provided in the light sensing circuit 35 in order to monitor a modulated light.

A shutter 41 is provided ahead of the optical path through which the modulated laser beam ML reflected by the beam splitter 40 reaches the horizontal deflector of the two-dimensional scanner 13 (see FIG. 1). The shutter 41 is operated under the control of a vertical blanking signal from the vertical blanking signal generator 38 so that it cuts off the modulated laser beam upon measurement mode. Alternatively, the vertical blanking signal generator 38 might be a horizontal sync. signal generator. In that case, the shutter 41 and the switch 32A are controlled during the horizontal blanking period. The vertical or horizonal blanking signal is generated as follows. That is, the composite video signal CS supplied to the input terminal T2 is supplied to a sync. separator 39, in which it is separated to provide a sync. signal. This sync. signal is supplied to the vertical or horizontal blanking signal generator 38 which then detects the vertical or horizontal blanking signal.

The modulated laser beam ML supplied to the light sensing circuit 35 is converted into an analog electrical signal AS by the photo-diode or the like. This analog signal AS is converted into digital data DD by the A/D converter 36 and the digital data is supplied to the CPU 37. The CPU 37 calculates the tone correction data CD on the basis of the digital data supplied thereto. The CPU 37 allows the tone correction data CD to be stored in the RAM 33 and outputs the test signal TS, the address signal ADS and the address select signal CS.

Figure 6:
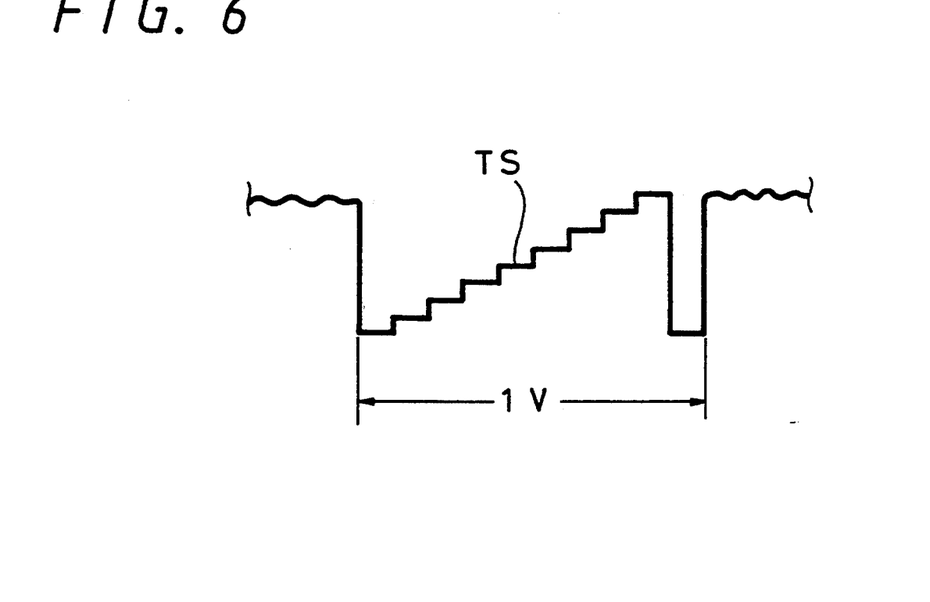
FIG. 6 is a diagram of a waveform of a test signal used in the tone correcting apparatus according to the present invention.

In the tone correcting circuit thus arranged, upon measurement mode, the digital test signal TS having a stair-shaped waveform whose level is sequentially increased at a predetermined level is inserted into a vertical blanking period 1V (or horizontal blanking period 1H) as shown in FIG. 6 to thereby measure a light intensity of the modulated laser beam ML that is output from the light modulator 3 at that time. On the basis of the light intensity thus measured, the tone correction data is calculated by the CPU 37 and the data thus calculated is stored in the RAM 33. During other period than the vertical blanking period 1V (or the horizontal blanking period 1H), data corresponding to the video signal is read out from the RAM 33 to correct the tone.

Tone correction data is obtained as follows.

The vertical blanking signal generator 38 detects the starting portion of the blanking period 1V (1H) of the vertical (horizontal) blanking signal on the basis of the sync. signal that is separated from the composite video signal or the like by the sync. signal separating circuit 39. Then, the switch 32A in the multiplexer 32 is connected in the illustrated state to present the measurement mode, and the test signal TS (see FIG. 6) supplied from the CPU 37 is supplied to the switch 32B.

The test signal TS is supplied from the CPU 37 to the RAM 33, which corrects the tone, as the read address ADS. At that time, the switch 32B is connected in the opposite state (different mode). The measurement mode and other mode are switched by the address select signal CS from the CPU 37.

Data corresponding to the read address ADS is output from the RAM 33. This output is converted by the D/A converter 34 into an analog signal, and this analog signal is input to the light modulator 3 as a drive signal.

The modulated laser beam ML modulated in response to the input signal is emitted from the light modulator 3. Then, the modulated laser beam passed from the beam splitter 40 is introduced into the photo-diode in the monitor light sensing circuit 35. The analog signal AS thus converted into the electrical signal by the photo-diode is converted into the digital data DD by the A/D converter 36 and then supplied to the CPU 37.

The modulated laser beam ML reflected by the beam splitter 40 is interrupted by the shutter 41 so that the modulated laser beam ML can be prevented #rom being introduced into the deflector in the two-dimensional scanner 13 (see FIG. 1), i.e., the modulated laser beam ML can be prevented from being projected onto the screen 22 (see FIG. 1) or the like.

The modulated laser beam ML is interrupted under the control of the shutter 41 in synchronism with the blanking signal so that the interrupting period becomes coincident with the retrace period of 1V (1H) of the vertical (horizontal) blanking signal from the vertical blanking signal generator 38. The shutter 40 may be constructed in an electrical or mechanical fashion. Alternatively, the shutter 41 need not be provided but instead, the vertical and horizontal deflections in the two-dimensional scanner 13 are carried out during the blanking period such that the modulated laser beam ML reflected by the beam splitter 40 may not be projected onto the screen 22 (see FIG. 1). Therefore, a picture in which slant lines are inserted in the measurement mode can be prevented from being displayed on the screen 22 of the display apparatus. Tone correction data is calculated from the monitor digital data DD on the basis of software provided within the CPU 37. The calculation method of tone correction data will be described below.

Figure 7:
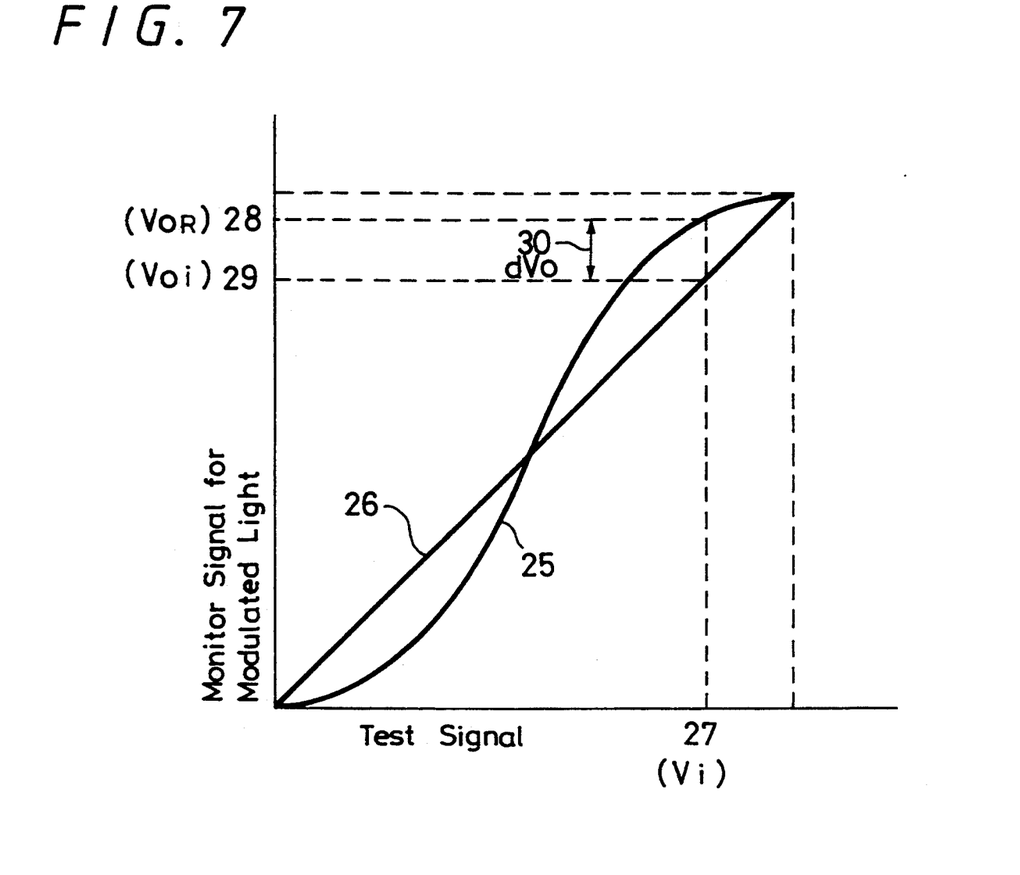
FIG. 7 is a characteristic graph used to explain a relation between the test signal of the tone correcting apparatus according to the present invention and a monitor signal.

FIG. 7 schematically shows a relationship between a normalized test signal TS and a monitor signal (intensity of light) of the normalized modulated laser beam ML in the video signal system including the light modulator 3.

In FIG. 7, a curve 25 represents an actual tone characteristic and a straight line 26 presents an ideal tone characteristic. When the curve 25 is increased monotonically as shown in FIG. 7, if the normalized test signal TS is taken as Vi (e.g., reference numeral 27 in FIG. 7), tone correction data SCD read out from the RAM 33 for the test signal TS, i.e., a modulation drive signal that drives the light modulator 3 is taken as Vc, a monitor signal of the actual modulated laser beam ML is taken a $V_{OR}$ (reference numeral 28 in FIG. 7) and a monitor signal of the ideal modulated laser beam ML is taken as $V_{oi}$ (reference numeral 29 in FIG. 7), then the ideal straight line 26 can be expressed as $V_{oi}=V_i$. Therefore, the difference $dV_0$ (reference numeral 30 in FIG. 7) between the curve 25 and the monitor signal of the modulated laser beam on the straight line 26 can be expressed by the following equation.

$$dV_0 = V_{0R} - V_{0i} = V_{0R} - V_i$$

Then, tone can be corrected by subtracting from the value of original data a value of data which corrects tone for the test signal $V_i$ by $K \times dV_0$ that results from multiplying the difference $dV_0$ with a constant K ($0 < K < 1$).

That is, a value Vc' of new data is obtained by the calculation of $Vc' = Vc - K \times dV_0$ by using the CPU 37.

Tone correction data $CD = Vc'$ thus obtained is stored in the RAM 33 from the CPU 37. At that time, the switch 32B is connected in the illustrated state and is supplied with the address signal ADS from the CPU 37 as a write address used when the correction data CD is stored in the RAM 33.

In the above-mentioned equation, the constant K is obtained experimentally and it is sufficient that K is about 0.5 to 0.7.

Then, the measurement is carried out again by using the new correction data $CD = Vc'$ and a difference of monitor voltage of the modulated laser beam ML is calculated to thereby obtain further new tone correction data. When the aforesaid operation is repeated, the tone correction data CD is converged and an actual tone characteristic can be corrected to the ideal straight line 26.

During the period other than the vertical blanking period or horizontal blanking period, the video signal VS is converted by the A/D converter 31 into digital data. Then, when the movable contact of the switch 32A in the multiplexer 32 is connected in the opposite state (opposite mode), such digital data from the A/D converter 31 is supplied to the switch 32B. Then, the digital data of the video signal VS is supplied through the switch 32B to the RAM 33 as the read address ADS.

Tone correction data SCD that corrects the tone characteristic of the light modulator 3 is output from the RAM 33 to the D/A converter 34. Then, the D/A converter 34 converts the tone correction data SCD into the analog signal. This analog signal is input to the light modulator 3, from which there is derived the modulated laser beam ML corresponding to the video signal VS.

The tone correcting apparatus according to the present invention is constructed and operated as described above so that the tone correction data is automatically calculated and modified during the vertical or horizontal retrace period. Therefore, even when the tone characteristic is changed due to a drift of temperature and an aging change of the light modulator 3, the tone can be corrected following the change. Further, since of operation for obtaining tone correction data the measurement of the monitor signal relative to the test signal and the writing of data in the RAM 33 are carried out during the blanking period or the horizontal blanking can be prevented from being projected onto the picture screen, the tone can be corrected while the image of video signal is being displayed on the picture screen under the normal condition.

While the calculation is carried by the software in the CPU 37 as described above, the calculating circuit can be arranged by a subtracting circuit and a multiplying circuit from a hardware standpoint.

According to the present invention, there can be obtained the tone correcting apparatus which can achieve the following effects.

Since the tone correcting apparatus of the present invention includes the monitor circuit for monitoring tone characteristics and the CPU for calculating tone correction data, the external measuring apparatus, calculating apparatus or the like need not be provided.

Further, since the tone can be corrected automatically, upon assembly of the set or after the assembly, the tone correcting apparatus of the present invention need not be adjusted for correcting the tone.

Furthermore, since the tone characteristic is measured during the blanking period, the tone can be corrected while the image of video signal is being projected on the picture screen under the normal condition.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A tone correcting apparatus for an image display apparatus in which a light from a light source is modulated on the basis of a video signal and displayed as an image, comprising:
    a) test signal generating means for generating a test signal, wherein the test signal is generated during a blanking period of said video signal;
    b) memory means for outputting tone correction data on the basis of said test signal;
    c) modulating means for modulating the light from said light source on the basis of said tone correction data;
    d) detecting means for detecting the modulated light from said modulating means; and
    e) control means for calculating correction data on the basis of the modulated light detected by said detecting means and storing said correction data in said memory means.

2. The tone correcting apparatus according to claim 1, wherein said light source is a laser.

3. The tone correcting apparatus according to claim 1, further comprising preventing means for preventing a modulated light from said modulating means from reaching a display screen during said blanking period of said video signal.

4. The tone correcting apparatus according to claim 3, wherein said light source is a laser.

5. The tone correcting apparatus according to claim 1, wherein said control means calculates correction data $Vc'$ in the form of $Vc' = Vc - K \times dV0$ where $Vc$ is the original correction data, $K$ is the constant and $dV0$ is the difference between a detected signal of an actual modulated light and a detected signal of an ideal modulated light.

6. The tone correcting apparatus according to claim 5, wherein said constant $K$ is 0.5 to 0.7.

7. The tone correcting apparatus according to claim 6, wherein said light source is a laser.

8. A laser display apparatus in which a laser beam emitted from a laser light source is modulated on the basis of a video signal to form a modulated light and said modulated light is displayed, comprising:
   1) synchronizing separating means for separating a synchronizing signal from said video signal;
   2) test signal generating means for generating a test signal;
   3) selecting means for selecting any one of said video signal and said test signal on the basis of said synchronizing signal;
   4) memory means for outputting tone correction data on the basis of either said video signal or said test signal from said selecting means;
   5) modulating means for modulating a light from said laser light source on the basis of said tone correction data;
   6) detecting means for detecting a modulated light from said modulating means; and
   7) control means for calculating said tone correction data from a detected signal from said detecting means on the basis of said test signal and storing said tone correction data in said memory means.

9. The laser display apparatus according to claim 8, further comprising preventing means for preventing the modulated light from said modulating means from reaching a display screen on the basis of said synchronizing signal.

10. The laser display apparatus according to claim 8, further comprising digital-to-analog (D/A) converting means for D/A-converting said tone correction data and supplying the tone correction data thus converted to said modulating means and analog-to-digital (A/D) converting means for A/D-converting the output of said detecting means and the output thus converted to said control means.

* * * * *